April 23, 1968 E. BENNATI 3,379,446
COLLET CHUCK
Filed May 13, 1965 2 Sheets-Sheet 1
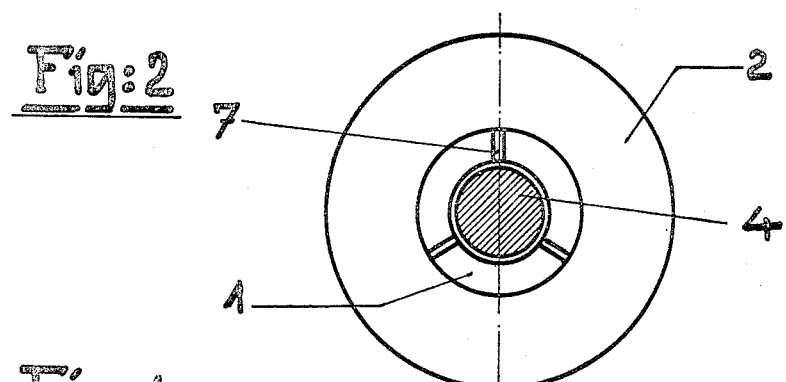
Fig:2
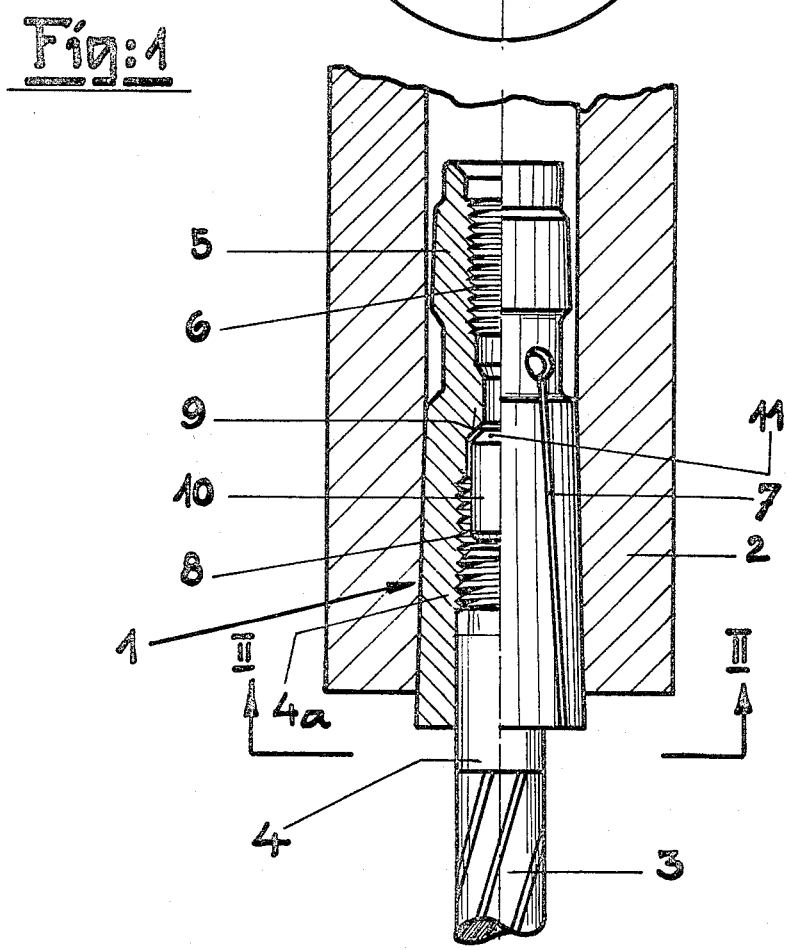
Fig:1

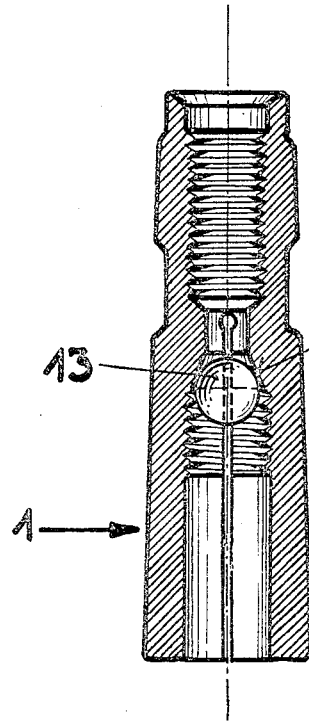
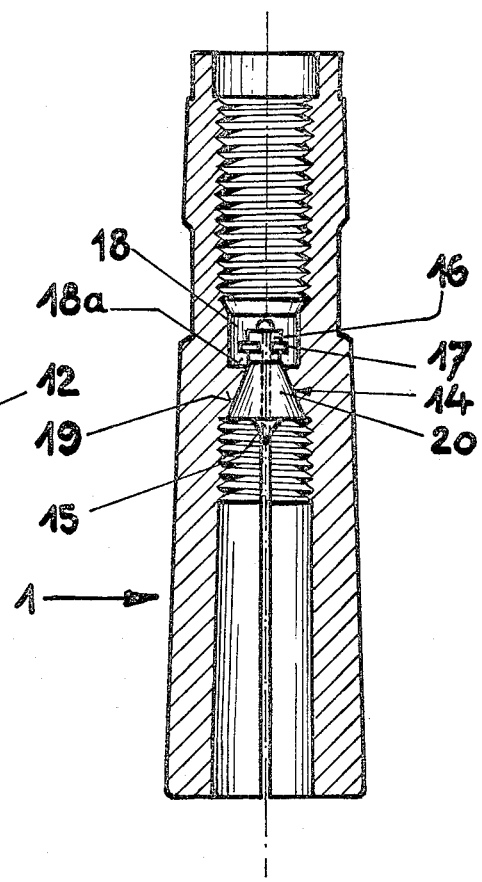

United States Patent Office 3,379,446
Patented Apr. 23, 1968

3,379,446
COLLET CHUCK
Edmo Bennati, Frasine di Mantova, Italy, assignor to Richard Glimpel, Lauf, Pegnitz, Germany
Filed May 13, 1965, Ser. No. 455,363
Claims priority, application Italy, May 15, 1964, 10,377/64
4 Claims. (Cl. 279—51)

ABSTRACT OF THE DISCLOSURE

In a collet of the type having spring fingers pulled into a tapered opening to move the fingers inwardly to clamp a tool, and provided with screw threads in its inner end to receive the threaded end of a tool to be held by the chuck, an arrester body is placed in the chuck to be engaged by the end of the tool when placed in the chuck, the arrester body bearing against an inwardly directed conical shoulder at the inner end of the chuck so that, upon release of the chuck so that, upon release of the chuck, the tool can be easily unscrewed and removed therefrom.

---

The invention relates to an elastic, split collet chuck, for accommodating and holding tools, particularly cutters, with a threaded end to be inserted in the chuck socket.

The known collet chucks of this kind have at their unsplit end and internal thread, into which the shaft of a tool is screwed after being inserted into the opened chuck. This collet chuck is connected, for example, through a tapered head stock and a bushing with the machine spindle of a machine tool. The thread on the tool shaft serves to effect the self-clamping of the tool in the collet and in case of a rotation of the shaft in relation to the chuck, brought about by a great stress exerted on the tool, the shaft is rotated further in the threaded portion and against a stop, the clamping of the shaft in the collet chuck is intensified.

The tools fastened to a machine with such a self-clamping effect are difficult to release after use, since the individual parts, namely tool, collet chuck, bushing and tapered head stock, under increasing loads are increasingly firmly screwed together and clamped. The purpose of the invention is to create a collet for such a chuck suitable for tools with a cylindrical shaft, as well as for tools with a threaded shaft, exploiting the self-clamping effect on machine tools, while avoiding the difficulties in the removal of the tool especially where the shaft of the tool is threaded.

The invention consists in making the tool seat, i.e. the split portion of the collet, with a thread and an inner end provided with an internal conical shoulder and an axially movable arrester body having a taper complementary to the cone. When the collet chuck has been clamped into a machine spindle, the arrester body is fast within the collet chuck. Self-clamping occurs on rotation of the tool. When, however, the collet chuck is released from the machine chuck, then, owing to the slits, both the arrester body and the shaft are so loose in the collet chuck that the tool can be unscrewed by hand, since the arreser body and the shaft cease to be pressed against each other as well. By means of the collet chuck of the invention it is not only possible to clamp cylindrical or threaded shafts into position on the machine, but the self-clamping, i.e. the intensity of the tool clamping which increases with the load, is achieved with a substantially smaller number of parts than hitherto possible.

The arrester body tapering with the internal cone of the collet chuck advantageously has a conical end. However, this purpose is also served by a spherical arrester body. A spherical arrester body has the advantage that it does not need to be specially manufactured, since balls are commercially available. The bearing end of the arrester body, against which the end of the tool shaft presses, may have any suitable form. Since the majority of the tool shafts have a conical centering bore on their front face, it is advantageous to provide the arrester body according to the invention with a centering projection.

The invention will now be explained with reference to examples of embodiment illustrated in the accompanying drawing, wherein:

FIG. 1 shows a collet chuck with machine spindle and tool, in partial section;
FIG. 2 is a section along the line II—II of FIG. 1;
FIG. 3 shows a collet chuck with a tool seat of a different type and with a spherical arrester body and
FIG. 4 shows a collet chuck with an arrester body having a centering projection.

The conical collet chuck 1 having an axial tool receiving socket shown in FIGS. 1 and 2 is seated in a machine spindle 2 and accommodates the tool shaft 4 of a cutter 3. In its full end 5 the collet chuck 1 has an internal thread 6, into which a turnbuckle (not shown) is screwed for fastening the collet chuck to the machine. In the region of slits 7, the collet chuck 1 has an internal thread 8 and an internal conical shoulder 9. The collet chuck 1 accommodates an arrester body 10 which is axially movable and which has a conical end 11 complementary to the conical shoulder 9. The general shape of the arrester body 10 is otherwise cylindrical. Into the inside thread 8 there is screwed the thread 4a of the threaded shaft 4. The conical end 11 rests against the internal conical shoulder 9. The diameter of the cylindrical portion of the arrester body 10 is smaller than the diameter of the surrounding collet chuck. When fully screwed in, the tool shaft 4 presses against the arrester body 10.

When fastening the tool to the machine, the shaft 4, 4a is first screwed into the thread 8 of the collet chuck 1. Following this, the collet chuck 1 is set into the machine spindle 2 and is tightened into the conical bore of the machine spindle by means of the turnbuckle and thread 6. Thereupon, the internal diameter of the collet chuck 1 narrows and the arrester body 10, owing to its conical end 11 and the internal conical shoulder 9, is urged by wedging action downwards in the plane of the drawing, so that it does not hinder a narrowing of the diameter. If now the shaft 4 is caused to rotate owing to a great stress exerted on the tool, then shaft 4 will be moved upwards owing to the thread 8. To this end, the thread 4a of the shaft 4 and the inside thread 8 have been formed suitably in a known manner. The upward movement of the shaft 4, when occurring, is very soon stopped by the arrester body 10, since the latter cannot move upwards owing to the internal conical shoulder. As the stress on the tool increases, the shaft 4 is screwed more intensively into the inside thread 8 and is pressed against the arrester body 10. If now the collet chuck 1 is released from the machine chuck 2, then, owing to its slits, its internal diameter will expand owing to the pressure exerted radially by the arrester body 10. The arrester body 10 slides upwards in the widening conical shoulder 9, so that its pressure on the threaded shaft 4 ceases and said shaft 4 can be unscrewed by hand.

FIG. 3 shows a collet chuck 1, the interval cone, conical surface or conical shoulder 12 of which has a smaller summit angle than the internal cone on conical shoulder 9 of FIG. 1 and which has a ball 13 as an arrester body.

FIG. 4 shows a collect chuck 1, the arrester body 14 of which has a centering projection 15, a conical portion 20 and a cylindrical extension 16, on which a retaining ring 17 is seated. The retaining ring 17 projects into an enlarged recess 18 of the collet chuck, which is limited by a small shoulder 18a at the smaller end of the internal cone, conical shoulder or conical surface 19. This retaining ring 17 on extension 16 extending beyond said conical shoulder 19 prevents the arrester body or stop 14 from falling out of the chuck 1, but does not hinder the necessary axial movements of the arrester body 14.

Essential for the mode of functioning of the collet chuck according to the invention is the conversion of axial pressure into radial pressure and inversely. The arrester body, which is axially pressed into the collet chuck, exerts radial pressure on the collet chuck and inversely, i.e. said arrester body, when pressed radially by the collet chuck, is axially displaced. This property of the arrester body of converting axial pressure into radial pressure ensures its functioning as a fixed stop, which is necessary for the self-clamping action. This same property also ensures the firm positioning of the tool as the collet chuck is mounted into the machine spindle. If in a different construction of the arrester body the radial pressure exerted thereon were not resulting in an axial displacement, then the collet chuck would receive a satisfactory clamping by the machine chuck only in the region of the arrester body. Due to this, the contact surface between the collet chuck and the machine chuck would be too small and the internal diameter of the collet chuck would be so great, that it could not exert any pressure on the shaft of the tool so that the latter would have to be held by the thread alone.

The easy rotation of the tool shaft in the inside thread of the loosened collet chuck and the mode of action of the axially movable arrester body can be substantially improved by a form of thread in which the cross-section of the thread fillet widens outwards from the thread base, as is the case for example with a Whitworth- or Sellbra- thread.

What I claim is:
1. In a collet chuck of the type comprising an externally tapered, longitudinally split collet element providing a socket and adapted to be tightened by drawing the tapered body against an axially tapered surface of a machine tool spindle, said socket being provided with screw threads to receive a threaded end portion of a tool to be held by said collet, the novelty comprising a conical shoulder in said collet at the end of said socket to form an abutment and an axially movable arrester body engaging said conical shoulder and extending into said socket to be engaged by a tool placed in said chuck.

2. The device of claim 1 in which said arrester body has a conical surface complementary to said conical shoulder.

3. The device of claim 1 in which said arrester body is a ball.

4. The device of claim 1 in which said chuck is provided with an enlarged recess beyond said conical shoulder, said arrester body is provided with an extension extending into said enlarged recess, and said extension being provided with means within said enlarged recess to retain said arrester body loosely in said chuck.

References Cited
UNITED STATES PATENTS

| | | | |
|---|---|---|---|
| 3,028,168 | 4/1966 | Hughes | 279—52 X |
| 3,120,961 | 2/1964 | Clarkson | 279—51 |

ROBERT C. RIORDON, *Primary Examiner.*

E. A. CARPENTER, *Assistant Examiner.*